United States Patent [19]
Bartram et al.

[11] Patent Number: 5,143,621
[45] Date of Patent: Sep. 1, 1992

[54] METHOD OF CHEMICAL DECONTAMINATION

[75] Inventors: Philip W. Bartram, Abingdon; Noel C. DiBona, Aberdeen Proving Ground, both of Md.; James H. Buchanan, Newark, Del.; Dennis K. Rohrbaugh, Bel Air, Md.

[73] Assignee: The United States of America as represented by the Secretary of the Army, Washington, D.C.

[21] Appl. No.: 718,319

[22] Filed: Jun. 17, 1991

[51] Int. Cl.$^5$ .............................. B01D 15/04
[52] U.S. Cl. .................. 210/690; 210/908; 210/911; 570/179

[58] Field of Search ............ 210/690, 908, 911; 570/179

[56] References Cited

U.S. PATENT DOCUMENTS 3,531,463  9/1970  Gustafson .............. 210/692
4,842,746  6/1989  Fowler et al. .......... 210/689

Primary Examiner—Ivars Cintins
Attorney, Agent, or Firm—Anthony T. Lane; Edward Goldberg; Edward Costigan

[57] ABSTRACT

An improved method of decontaminating a solvent which contains mustard. The improvement consists essentially of using polydivinylbenzene to absorb the said mustard.

4 Claims, 2 Drawing Sheets

METHOD OF CHEMICAL DECONTAMINATION

GOVERNMENTAL INTEREST

The invention described herein may be made, used or licensed by or for the Government for governmental purposes without the payment to us of any royalties thereon.

FIELD OF USE

This invention relates to the decontamination of a chemical solvent containing mustard (HD).

More particularly, this invention relates to the adsorption of HD from a chlorofluorocarbon solvent by a macroreticular strong acid resin.

BACKGROUND

At present, a nonaqueous equipment decontamination system (NAEDS) provides the U.S. Army with the capability to remove chemical agent contamination from electronics, avionics, and other items sensitive to conventional decontaminating solutions.

The present system of the art includes a chlorofluorocarbon (CFC) spray, which removes the chemical warfare agent (CWA) from the item of interest. The resulting CFC solvent containing the CWA agent is processed by mixing with sodium hypochlorite in a conventional mixer. The CFC solvent is then separated from the aqueous hypochlorite by decanting, and then by distilling off the solvent CFC.

The system now in use was developed for operation in a large facility or plant. Therefore, the size and weight of the system was never critical. However, due to the fact that the decontaminating equipment was too large, heavy, and energy intensive, it could not be easily adapted to a mobile unit for use in the field.

SUMMARY OF THE INVENTION

It is an object to provide an adsorption process that could be utilized to remove mustard (HD) from a conventional solvent, such as a chlorofluorocarbon.

A still further object is to provide an adsorption process that could be utilized to remove bis(2-chloroethyl)sulfide from 1,1,2-trichloro-1,2,2-trifluoroethane utilizing a polydivinylbenzene macroreticular strong acid resin.

Other objects and many of the attendant advantages of this invention will become more evident from a reading of this specification when taken with the accompanying drawings, wherein.

In considering whether a macroreticular strong acid resin could be utilized to decontaminate CFC containing HD, two major criteria were in point. If these two criteria could be satisfied, then the NAEDS purification system could merely be replaced by an adsorption column which is a smaller unit, and could be made mobile.

First, the rate of sorption of the chemical warfare agent (CWA) from the contaminated CFC solvent by the resin must be significantly greater than the rate of sorption of the CFC solvent itself by the resin.

Second, the rate of agent desorption from the column material containing the resinous material should be significantly less than the rate of sorption of the CWA by the resin.

This invention relates to the purification of CFC contaminated with HD, a chemical warfare agent, utilizing state-of-the-art sorption technologies. It focuses on the feasibility of removing bis(2-chloroethyl)sulfide, referred to herein as HD, from a chlorofluorocarbon solvent named 1,1,2-trichloro-1,2,2-trifluoroethane utilizing a macroreticular strong acid resin named polydivinylbenzene. The resin is commercially named Amberlite XE-393 obtained from Rohm and Haas Company, Philadelphia, PA.

PREFERRED EMBODIMENT MATERIALS

The HD sample (Lot No. HD-U-6216-CTF-N-1) used in these experiments was obtained from the Chemical Agent Standard Analytical Reference Material (CASARM) Program at the U.S. Army Chemical, Research, Development and Engineering Center (CRDEC). Originally synthesized in August 1986 and determined to be 97.3% (w/w) pure by multinuclear Nuclear Magnetic Resonance (NMR) Spectroscopy, this particular sample was recently monitored ($^{31}$P NMR, March 1990) with no degradation detected. The composition of the HD sample is shown in Table 1 which follows.

TABLE 1

| CHARACTERIZATION OF HD BY NMR | | |
|---|---|---|
| Compound | Mole % | Weight % |
| HD | 96.6 | 97.3 |
| dithiane | 1.5 | 1.1 |
| CH$_3$CH$_2$— | 0.8 | 0.5 |
| —CH$_2$CH$_2$— | 1.1 | 1.1 |

Figure 1:
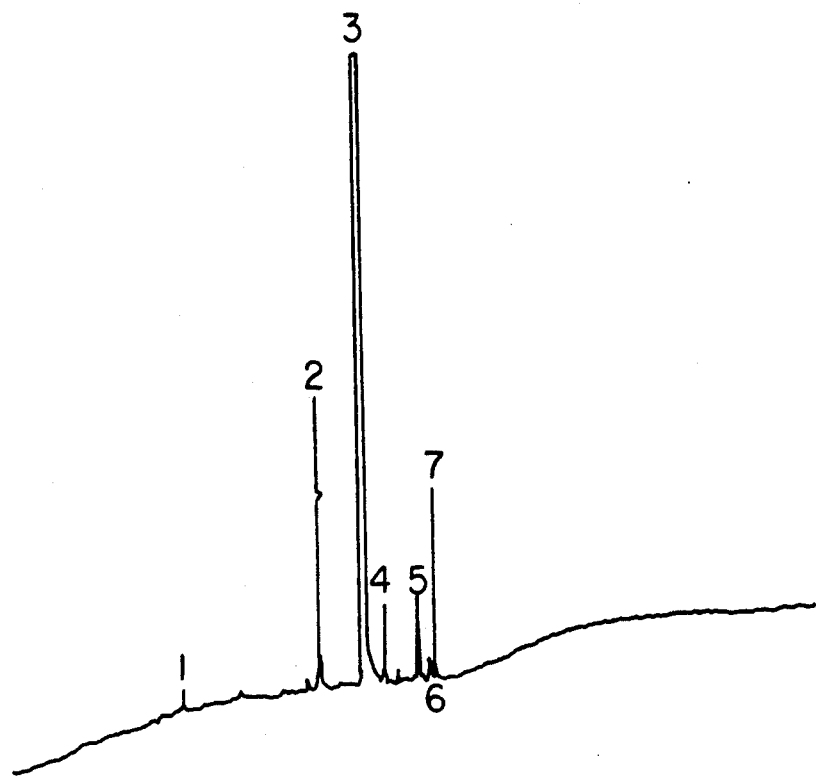
FIG. 1 shows a chromatogram of the conventional chemical warfare agent called mustard (HD).

Impurities, identified by Gas Chromatography/Mass Spectrometry (GC/MS) and matched by order of elution to Gas Chromatography (GC) results, appear in Table 2. Both GC and GC/MS data were obtained from the analysis of neat HD. The GC determined purity of the neat HD sample was 98.4% by area using a Flame Ionization Detector (FID). The neat HD chromatogram is shown in FIG. 1.

TABLE 2

| CHARACTERIZATION OF HD BY GC/MS AND GC | | | | |
|---|---|---|---|---|
| Peak No. | GC/MS Compound Identification | GC/MS-EI Results | | GC Results | |
| | | RT (min) | Area % | RT (min) | Area % |
| 1 | ClCH$_2$CH$_2$Cl | 1.6 | <0.1 | 2.9 | <0.1 |

TABLE 2-continued
CHARACTERIZATION OF HD BY GC/MS AND GC

| Peak No. | GC/MS Compound Identification | GC/MS-EI Results RT (min) | Area % | GC Results RT (min) | Area % |
|---|---|---|---|---|---|
| 2 |  | 5.4 | 0.5 | 5.0 | 0.7 |
| 3 | $ClCH_2CH_2-S-CH_2CH_2Cl$ | 7.2 | 98.9 | 5.8 | 94.8 |
| 4 | $ClCH_2CH_2-S-C_3H_6Cl$ | 7.6 | 0.2 | 6.1 | 0.2 |
| 5 | $ClCH_2CH_2-S-C_4H_8Cl$ | 8.6 | 0.1 | 6.6 | 0.1 |
| 6 | $ClCH_2CH_2-S-C_4H_8Cl$ | 8.6 | 0.1 | 6.7 | 0.1 |
| 7 | $ClCH_2CH_2-S-C_4H_8Cl$ | 9.1 | 0.3 | 6.9 | 0.5 |

The solvent, 1,1,2-trichloro-1-2,2-trifluoroethane, was obtained from E. I. Dupont de Nemours, Wilmington, Del. GC analysis using an FID resulted in an area % purity of 99.99. The only impurity eluted 12 seconds before the main peak using a 30 meter methylsilicone capillary column at 35 degrees C.

Amberlite XE-393 (Lot 84/0079), a polydivinylbenzene ion exchange resin, was supplied by Rohm and Haas Company, Philadelphia, Pa. The black spherical resin beads, with a surface area of 410 m²/g, and a 20/50 mesh range, were used as received.

EQUIPMENT

An HP 5880A GC equipped with an FID was used in this study. This GC equipment is commercially available from Hewlett-Packard Company, Valley Forge, Pa. The analysis of HD was accomplished using a 30 meter fused silica capillary column (0.32 mm ID) with a 0.25 um film of methylsilicone (Alltech Econocap Series SE-30). The carrier gas was helium split at a 50:1 ratio. Pressure controlled (47 KPa) column flow resulted in a calculated helium flow of 22.7 cm/sec (1.1 mL/min) based on the retention gap (2.2 minutes) obtained for methane at 40 degrees C. Detector make-up flow was helium at a rate of 23 mL/min. The injection port temperature was 225 degrees C. and the detector temperature was 300 degrees C. The column oven temperature was programmed from 75 to 275 degrees C. at 20 degrees C./min and held at 275 degrees C. for 10 minutes. The combustion gases were hydrogen and air, at 32 and 420 mL/min. A Hamilton 7001SN microliter syringe was used to manually inject 1.0 µL sample volumes. Area integration of the resulting chromatographic peaks was accomplished electronically.

PROCEDURE

To determine the adsorption efficiency of Amberlite XE-393 resin, a master dilution of HD in CFC was prepared. To 100 µL (127.10 mg) of HD, 10 mL of CFC were added volumetrically. This solution was transferred to a 10 mL glass reaction vial containing a small, teflon-coated magnetic stirbar, and sealed with a teflon-lined silicone septum and an aluminum crimp cap. This 1% (v/v) HD solution served as both the experimental sample for resin adsorption testing and as the master standard for further dilution and calibration in the concentration range of interest. This concentration was calculated to be the maximum agent concentration challenged by the NAEDS.

Duplicate samples were prepared by the addition of 2.0 mL of the master standard solution (1% HD in CFC) to each of two 10 mL glass reaction vials containing a small, cylindrically shaped, teflon-coated, magnetic stirbar and 200 mg of Amberlite XE-393 resin. The vials were sealed with a teflon-lined silicone septum and an aluminum crimp cap. The mixtures were stirred at 500 rpm. Stirring was interrupted after 10 minutes, two hours, and four hours to enable sampling of the liquid with a Hamilton 7001SN microliter syringe. For each sampling, a ⅜-inch, 25 gauge stainless steel needle was used to vent the sample to assure exactly 1.0 µL of liquid was withdrawn. During periods when the sample was not being stirred, the resin separated from the HD/CFC solution. The lower layer, containing HD and CFC, was sampled for chromatographic analysis. All work was performed at room temperature (25±1 degrees C.) in an air atmosphere.

The HD adsorption efficiency of Amberlite XE-393 resin for HD-contaminated CFC was evaluated at three different resin concentrations. Duplicate samples were prepared with 10% resin (200 mg) as described above. The same procedure was used to prepare samples with 15% (300 mg) and 20% (400 mg) resin.

Calibration

A series of dilutions were prepared volumetrically from the 1% HD in CFC master standard as described in Table 3. A 1.0 µL aliquot of each was injected manually into the GC using the conditions and parameters heretofore described. HD eluted at 5.8 minutes (peak 3) as shown in FIG. 1. Duplicate dilutions were made for the fourth dilution (0.10%) since a distinct difference in detector response was noted. Excellent reproducibility (±1%) was obtained for sample concentrations in this range.

TABLE 3
CHROMATOGRAPHIC CALIBRATION STANDARDS FOR HD IN CFC

| Dilution | HD Standard Preparation | HD (mg) | HD (µL) | CFC (mL) | HD Concentration (Percent) v/v | w/v | w/w | ppm | GC Area Counts HD |
|---|---|---|---|---|---|---|---|---|---|
| 1 | 100 µL = 127.1 mg + 10.0 mL CFC | 127 | 100 | 10.0 | 1.00 | 1.27 | 0.81 | 10,000 | 749.9 |
| 2 | 0.2 mL dil. #1 + 0.2 mL CFC | 2.54 | 2.00 | 0.4 | 0.50 | 0.64 | 0.41 | 5,000 | 359.0 |
| 3 | 0.2 mL dil. #2 + 0.2 mL CFC | 1.27 | 1.00 | 0.4 | 0.25 | 0.32 | 0.20 | 2,500 | 181.5 |

TABLE 3-continued

CHROMATOGRAPHIC CALIBRATION STANDARDS FOR HD IN CFC

| Dilution | HD Standard Preparation | HD (mg) | CFC (μL) | (mL) | HD Concentration (Percent) v/v | w/v | w/w | ppm | GC Area Counts HD |
|---|---|---|---|---|---|---|---|---|---|
| 4 | 0.1 mL dil. #1 + 0.9 mL CFC | 1.27 | 1.00 | 1.0 | 0.10 | 0.13 | 0.08 | 1,000 | 128.2 |
| 4 | 0.1 mL dil. #1 + 0.9 mL CFC | 1.27 | 1.00 | 1.0 | 0.10 | 0.13 | 0.08 | 1,000 | 129.5 |
| 5 | 0.2 mL dil. #4 + 0.2 mL CFC | 0.25 | 0.20 | 0.4 | 0.05 | 0.064 | 0.04 | 500 | 62.2 |
| 6 | 0.1 mL dil. #4 + 0.9 mL CFC | 0.013 | 0.010 | 1.0 | 0.01 | 0.013 | 0.008 | 100 | 17.4 |
| 7 | 0.1 mL dil. #6 + 0.9 mL CFC | 0.0013 | 0.0010 | 1.0 | 0.001 | 0.0013 | 0.0008 | 10 | 1.7 |
| 8 | 0.1 mL dil. #7 + 0.9 mL CFC | 0.00013 | 0.00010 | 1.0 | 0.0001 | 0.00013 | 0.00008 | 1 | 0.4 |

Figure 2:
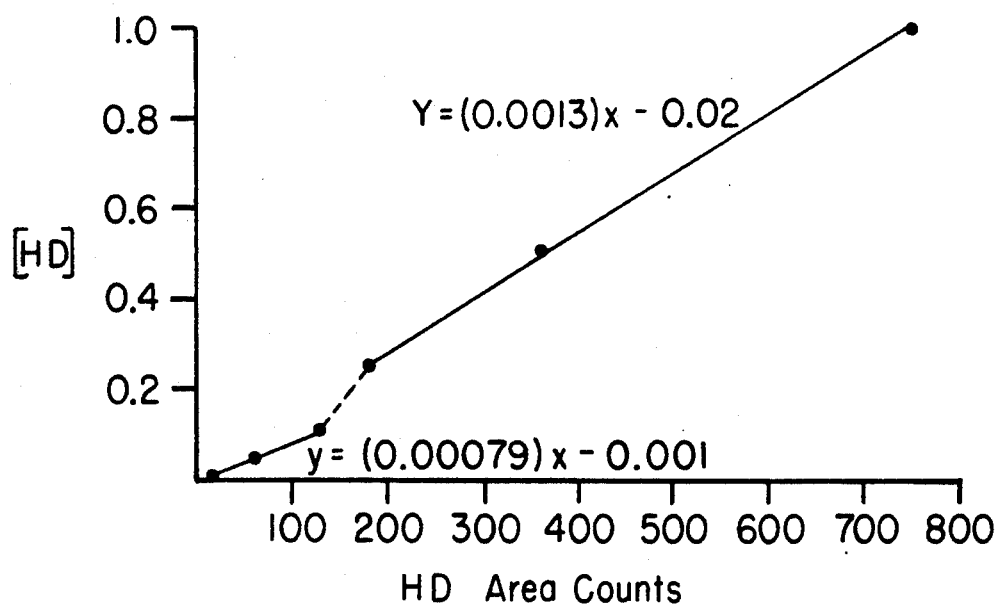
FIG. 2 shows a chromatographic calibration curve showing the interrelationship between the concentration of HD expressed as volume percent in chlorofluorocarbon and HD expressed as area counts.

Quantitative analysis of HD in CFC was accomplished using gas chromatography. A calibration curve was generated relating HD area counts to a known concentration of HD in CFC. HD area counts obtained for experimental samples of unknown HD concentration which had been exposed to the resin in the CFC solvent were quantitated based on this linear relationship. FIG. 2 reveals two lines with significantly different slopes. The line defined by the relationship $y = (0.0013)x + 0.02$ was used to determine the HD concentration for experimental samples when the GC area count for HD was greater than 180. When the count was less than 130, $y = (0.00079)x - 0.001$ was used. Since experimental data did not fall between these two values (FIG. 2, dashed line), interpolation was not required. Calibration data is presented in Table 3 set forth above.

MINIMUM DETECTABLE LEVEL

The FID Minimum Detectable Level (MDL) for HD was determined to be 1 ng with a signal of better than twice the noise level for a 1.0 uL injection of HD in CFC. This corresponds to 0.0001% (v/v) HD concentration in CFC. Since 1% HD in CFC was chosen as the starting concentration for adsorption testing with Amberlite XE-393, the described procedure detected HD at the MDL after 99.99% had been adsorbed.

ADSORPTION CRITERIA

Two major criteria were considered in evaluating the NAEDS purification system for replacement by an adsorption column. First, the rate of sorption of threat chemical warfare agents from the contaminated CFC solvent must be significantly greater than the rate of sorption of the CFC solvent by the resin. Ideally, the CFC solvent would function solely to carry the agent to the sorption material. Second, the rate of agent desorption from the resinous column material should be significantly less than the rate of sorption.

HD ADSORPTION DATA

Tables 4 and 5 hereinafter set forth present a summary of the data obtained for this series of static adsorption experiments carried out using a concentration of 10 mL of HD per liter of CFC solvent. Samples "E" and "F" contained 10% Amberlite XE-393 resin, sample "G" had 15%, and sample "H" had 20%. Inspection of GC adsorption data in Table 4 and 5 revealed consistent results. The major HD impurity, dithiane, was totally adsorbed in less than two hours, regardless of resin concentration. The only HD impurities not adsorbed after four hours (20% resin) were the six-carbon, chlorinated sulfides, identified as peaks 5 and 7, respectively. See Tables 4 and 5 and FIG. 1.

TABLE 4

| Peak Number | Compound | HD Area Counts by GC-FID Sample "E" 10% Resin | | | | Sample "F" 10% Resin | | | |
|---|---|---|---|---|---|---|---|---|---|
| | | 0 hr | 10 min | 2 hr | 4 hr | 0 hr | 10 min | 2 hr | 4 hr |
| 1 | $ClCH_2CH_2Cl$ | 3.0 | 0.0 | 0.0 | 0.0 | 3.0 | 0.0 | 0.0 | 0.0 |
| 2 |  | 6.9 | 4.8 | 0.0 | 0.0 | 6.9 | 3.6 | 0.0 | 0.0 |
| 3 | $ClCH_2CH_2-S-CH_2CH_2Cl$ | 918 | 441 | 285 | 279 | 918 | 447 | 295 | 274 |
| 4 | $ClCH_2CH_2-S-C_3H_6Cl$ | 1.7 | 1.7 | 1.2 | 1.3 | 1.7 | 1.7 | 1.3 | 1.2 |
| 5 | $ClCH_2CH_2-S-C_4H_8Cl$ | 2.9 | 2.8 | 3.0 | 2.5 | 2.9 | 3.1 | 2.8 | 2.6 |
| 6 | $ClCH_2CH_2-S-C_4H_8Cl$ | 0.3 | 0.0 | 0.0 | 0.0 | 0.3 | 0.0 | 0.0 | 0.0 |
| 7 | $ClCH_2CH_2-S-C_4H_8Cl$ | 3.7 | 4.1 | 2.8 | 2.6 | 3.7 | 4.0 | 2.8 | 2.6 |
| 8 | UNKNOWN at 4.5 min. | 0.0 | 0.5 | 1.0 | 1.0 | 0.0 | 0.5 | 1.5 | 1.5 |

TABLE 5

| Peak Number | Compound | HD Area Counts by GC-FID Sample "G" 15% Resin | | | | Sample "H" 20% Resin | | | |
|---|---|---|---|---|---|---|---|---|---|
| | | 0 hr | 10 min | 2 hr | 4 hr | 0 hr | 10 min | 2 hr | 4 hr |
| 1 | $ClCH_2CH_2Cl$ | 3.0 | 0.0 | 0.0 | 0.0 | 3.0 | 0.0 | 0.0 | 0.0 |

TABLE 5-continued

| Peak Number | Compound | HD Area Counts by GC-FID | | | | | | | |
|---|---|---|---|---|---|---|---|---|---|
| | | Sample "G" | | 15% Resin | | Sample "H" | | 20% Resin | |
| | | 0 hr | 10 min | 2 hr | 4 hr | 0 hr | 10 min | 2 hr | 4 hr |
| 2 |  | 6.9 | 1.4 | 0.0 | 0.0 | 6.9 | 1.0 | 0.0 | 0.0 |
| 3 | $ClCH_2CH_2-S-CH_2CH_2Cl$ | 918 | 236 | 114 | 98 | 918 | 198 | 61 | 61 |
| 4 | $ClCH_2CH_2-S-C_3H_6Cl$ | 1.7 | 0.7 | 0.4 | 0.4 | 1.7 | 0.7 | 0.0 | 0.0 |
| 5 | $ClCH_2CH_2-S-C_4H_8Cl$ | 2.9 | 1.5 | 1.1 | 0.9 | 2.9 | 1.4 | 0.5 | 0.5 |
| 6 | $ClCH_2CH_2-S-C_4H_8Cl$ | 0.3 | 0.0 | 0.0 | 0.0 | 0.3 | 0.0 | 0.0 | 0.0 |
| 7 | $ClCH_2CH_2-S-C_4H_8Cl$ | 3.7 | 1.8 | 1.0 | 0.8 | 3.7 | 1.3 | 0.4 | 0.4 |
| 8 | UNKNOWN at 4.5 min. | 0.0 | 0.2 | 0.02 | 0.2 | 0.0 | 0.2 | 0.0 | 0.0 |

Table 6, below, shows the HD Adsorption by Amberlite XE-393 Resin in CFC Solvent in percent.

TABLE 6

| | Percent HD Adsorbed by Amberlite XE-393 Resin | | | |
|---|---|---|---|---|
| Time | 10% Resin Sample "E" | 10% Resin Sample "F" | 15% Resin Sample "G" | 20% Resin Sample "H" |
| 10 min | 40.2 | 39.5 | 67.1 | 72.1 |
| 2 hours | 60.8 | 59.4 | 91.1 | 95.3 |
| 4 hours | 61.5 | 62.2 | 92.4 | 95.3 |
| 23 hours | 62.6 | ND | ND | ND |

ND = Not Determined.

RATE OF HD ADSORPTION

Figure 3:
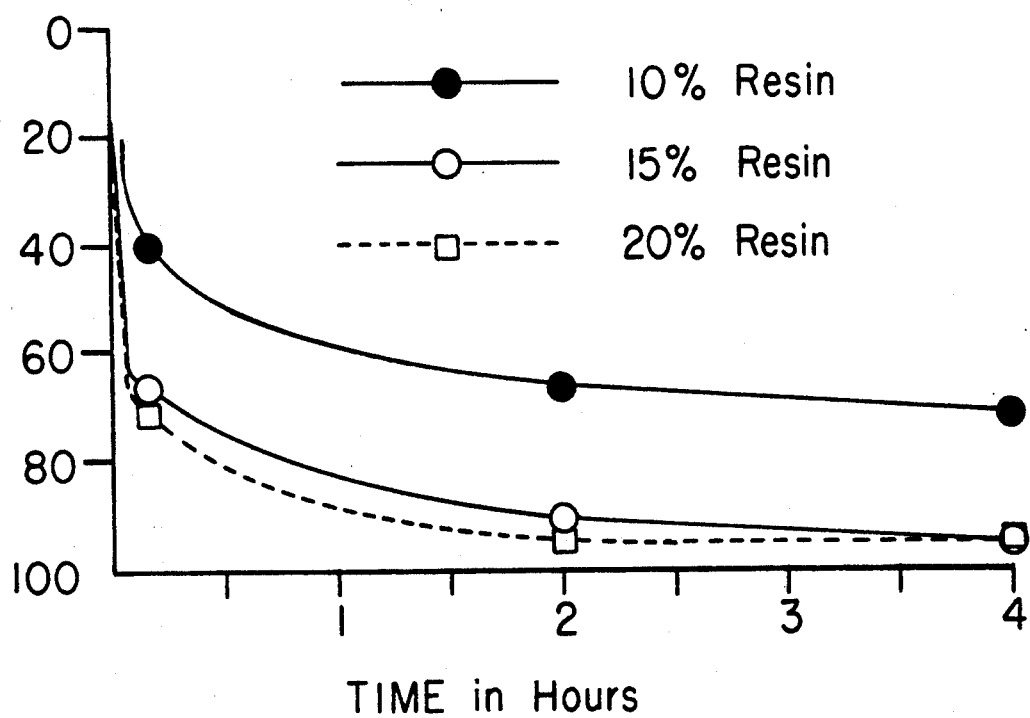
FIG. 3 is a graph of the percent of HD in a chlorofluorocarbon solvent (CFC) absorbed by the resin of the present invention in time expressed as hours.

The rate of HD adsorption is depicted graphically in FIG. 3. The rate of HD adsorption by Amberlite XE-393 resin is significantly greater than the rate of CFC adsorption. The rate of HD desorption from the resin material is less than the rate of HD adsorption. These two major criteria which were established show that the basis for the potential replacement of the huge NAEDS purification system have been met under the conditions tested.

The rate of HD adsorption is most significant during the initial stages for each of the three resin concentrations tested. During the first 10 minutes of the experiment with 10% resin, 40% of the HD initially present in the CFC mixture had been retained by the resin. After two hours, an additional 20% had been adsorbed. Little, if any, additional HD adsorption was observed after 23 hours.

EFFECT OF RESIN CONCENTRATION ON HD ADSORPTION RATE

HD adsorption results, for resin concentrations of 10%, 15%, and 20% (see Table 6), show a similar trend. Specifically, it appeared that the most significant amount of HD adsorption occurred in early stages of exposure to the resin regardless of resin concentration. For the tests with 15% and 20% resin, approximately 70% of the HD initially present was adsorbed in ten minutes. It took nearly two hours for the resin to adsorb the next 25% of HD at both resin levels. Insignificant changes in HD adsorption were observed from two to four hours.

A significant increase in both the rate of HD adsorption, and the capacity of the resin to adsorb and retain HD was observed when the resin concentration was increased from 10% to 15%. However, the increase in HD adsorption rate and resin capacity was not nearly as significant when the resin concentration was increased from 15% to 20%. The effect of resin concentration on HD adsorption rate is depicted graphically in FIG. 3.

RELEVANCE OF THE ABOVE DATE

The 1% agent concentration in CFC was chosen since it appears to be the maximum theoretical threat of agent that the NAEDS system might encounter. Amberlite XE-393 efficiently removes HD from contaminated CFC in a timely manner under the "static" conditions of the procedure of this invention.

CONCLUSIONS

The following conclusions can be drawn from this work.

a. Amberlite XE-393, called polydivinylbenzene, which is a macroreticular, strong acid resin, purified the HD-contaminated 1,1,2-trichloro-1,2,2-trifluoroethane solvent by removal of HD to the 0.05% (500 ppm) level. This corresponds to an HD adsorption efficiency of better than 95%. The most significant amount of HD adsorption occurred within the first ten minutes of exposure to the resin, regardless of resin concentration. The capacity of Amberlite XE-393 resin to adsorb HD is significantly increased with even a slight increase in resin concentration added to the 1,1,2-trichloro-1,2,2-trifluoroethane solvent. The rate of HD adsorption by Amberlite XE-393 resin is significantly accelerated by an increase in resin concentration added to the 1,1,2-trichloro-1,2,2-trifluoroethane solvent.

b. Amberlite XE-393 resin adsorbed all HD impurities, to some extent, from the HD-contaminated 1,1,2-trichloro-1,2,2-trifluoroethane solvent.

The foregoing disclosure is merely illustrative of the principles of this invention and is not to be interpreted in a limiting sense. We wish it to be understood that we do not desire to be limited to the exact details of construction shown and described, because obvious modifications will occur to a person skilled in the art.

What is claimed is:

1. In a method of decontaminating a non-aqueous chlorofluorocarbon solvent which contains mustard, the improvement consisting essentially of contacting said solvent with a polydivinylbenzene macroreticular strong acid resin to absorb up to about 95 percent of said mustard, said polydivinylbenzene macroreticular strong acid resin being present in the amount of between about 10 and 20 percent by weight based on said solvent.

2. The method of claim 1 wherein said polydivinylbenzene macroreticular strong acid resin is present at about 10 percent by weight based on said solvent.

3. The method of claim 1 wherein said polydivinylbenzene macroreticular strong acid resin is present at about 15 percent by weight based on said solvent.

4. The method of claim 1 wherein said polydivinylbenzene macroreticular strong acid resin is present at about 20 percent by weight based on said solvent.

* * * * *